US012631264B2

(12) United States Patent
Hergarden et al.

(10) Patent No.: US 12,631,264 B2
(45) Date of Patent: May 19, 2026

(54) MAGNETICALLY ACTUATED GATE VALVE

(71) Applicant: FMC Technologies, Inc., Houston, TX (US)

(72) Inventors: Thomas Hergarden, Spring, TX (US); Paul L. Riley, Houston, TX (US); John Calder, Tomball, TX (US); Jonathan Morley, Conroe, TX (US)

(73) Assignee: FMC Technologies, Inc., Houston, TX (US)

( * ) Notice: Subject to any disclaimer, the term of this patent is extended or adjusted under 35 U.S.C. 154(b) by 153 days.

(21) Appl. No.: 18/423,859

(22) Filed: Jan. 26, 2024

(65) Prior Publication Data

US 2025/0243944 A1 Jul. 31, 2025

(51) Int. Cl.
*F16K 31/08* (2006.01)
*E21B 34/04* (2006.01)

(52) U.S. Cl.
CPC ............ *F16K 31/082* (2013.01); *E21B 34/04* (2013.01)

(58) Field of Classification Search
CPC ............................... F16K 31/082; E21B 34/04
See application file for complete search history.

(56) References Cited

U.S. PATENT DOCUMENTS

| | | | |
|---|---|---|---|
| 4,681,298 A | | 7/1987 | Bodine et al. |
| 5,039,061 A | * | 8/1991 | Heard ................... F16K 31/086 |
| | | | 137/553 |

| | | | |
|---|---|---|---|
| 7,624,807 B2 | | 12/2009 | Vick, Jr. et al. |
| 8,210,208 B2 | | 7/2012 | Tibbitts et al. |
| 8,286,935 B2 | * | 10/2012 | White ................... F16K 3/0254 |
| | | | 251/129.01 |
| 8,453,749 B2 | * | 6/2013 | Vick, Jr. ............. F16K 31/1221 |
| | | | 166/374 |
| 9,518,672 B2 | | 12/2016 | Martino et al. |
| 9,624,753 B2 | | 4/2017 | Stinessen et al. |
| 2009/0218096 A1 | | 9/2009 | Vick, Jr. et al. |
| 2009/0293957 A1 | | 12/2009 | White |
| 2013/0056658 A1 | | 3/2013 | Borchgrevink et al. |
| 2016/0003001 A1 | | 1/2016 | Stinessen et al. |
| 2018/0291705 A1 | | 10/2018 | Paulo |

OTHER PUBLICATIONS

PCT Patent Application PCT/US24/54378 International Search Report and Written Opinion of the International Searching Authority issued Apr. 2, 2025.

* cited by examiner

*Primary Examiner* — Eric Keasel
(74) *Attorney, Agent, or Firm* — Erise IP, P.A.

(57) ABSTRACT

Systems, methods, and devices for magnetically actuating a gate valve of a subsea system via external magnetic actuation from a magnetic actuator. The magnetic actuator is disposed externally around a valve cavity such that motion of a valve stem disposed within the valve cavity can be controlled externally through magnetic coupling with the magnetic actuator such that a physical link (and the dynamic pressure seals associated therewith) is not needed to actuate the valve stem.

20 Claims, 5 Drawing Sheets

MAGNETICALLY ACTUATED GATE VALVE

TECHNICAL FIELD

Embodiments of the present disclosure relate to valve assemblies. More specifically, embodiments of the present disclosure relate to a magnetically actuated gate valve.

BACKGROUND

Hydraulic gate valves are commonly installed within subsea systems to control fluid flow within the subsea system at various points. For example, gate valves may be disposed on any of a subsea manifold, a subsea tree assembly, a chemical injection system, or components thereof. Many such valves include a spring-driven fail-close mechanism that biases the valve into a closed position when hydraulic pressure is vented or when the valve is not actively opened. However, the springs included in the fail-close mechanism are typically exceedingly large and powerful to account for the extreme pressure differential associated with deep subsea environments of 10,000 feet or more below surface level. Accordingly, the springs are large and expensive and impart large forces onto other more sensitive components of the valve.

Additionally, because subsea gate valves are typically hydraulically actuated, hydraulic fluid must be shipped to the working environment. There is also a risk of pollution due to leakage and venting of hydraulic fluid from the valve assembly or from the hydraulic lines that provide hydraulic fluid to the valve. Further still, existing gate valves rely on dynamic seals to provide a pressure seal between a valve cavity and valve bore as a valve stem is translated therethrough. The dynamic seals are prone to failure and are, by nature, less reliable than static seals. However, because the valve stem is moveable and a pressure seal is provided between the valve cavity and valve bore, static seals typically cannot be used.

SUMMARY

Embodiments of the present disclosure may solve the above-mentioned problems by providing a magnetically actuated gate valve having a gate stem that is magnetically coupled to one or more magnetic actuators such that the gate can be actuated externally.

In some aspects, the techniques described herein relate to a magnetically actuated gate valve for a subsea system. The magnetically actuated gate valve includes a valve stem disposed within a valve cavity of the magnetically actuated gate valve, the valve stem including a valve gate disposed at one end of the valve stem; at least one biasing element coupled to the valve stem, the at least one biasing element configured to bias the valve stem into a fail-close position; and a magnetic actuator magnetically coupled to at least a portion of the valve stem, the magnetic actuator configured to selectively adjust the valve stem between a closed position and an open position.

In some aspects, the techniques described herein relate to a valve assembly for a subsea system. The valve assembly includes a valve cavity; a valve stem disposed within the valve cavity, the valve stem including a valve gate disposed at one end of the valve stem; at least one biasing element disposed within the valve cavity and coupled to the valve stem, the at least one biasing element configured to bias the valve stem into a fail-close position; a magnetic actuator including one or more magnets magnetically coupled to a magnetic portion of the valve stem, the magnetic actuator configured to selectively adjust the valve stem between a closed position and an open position; and at least one seal disposed in the valve cavity providing a pressure seal.

In some aspects, the techniques described herein relate to a valve assembly for a subsea system, the valve assembly includes a valve cavity; a valve stem disposed within the valve cavity, the valve stem including a valve gate disposed at one end of the valve stem; at least one biasing element configured to bias the valve stem into a fail-close position; a magnetic actuator including one or more magnets magnetically coupled to a magnetic portion of the valve stem, the magnetic actuator configured to selectively adjust the valve stem; and an external actuator coupled to the magnetic actuator configured to drive motion of the magnetic actuator.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWINGS

Embodiments of the present disclosure are described in detail below with reference to the attached drawing figures, wherein.

Figure 1:
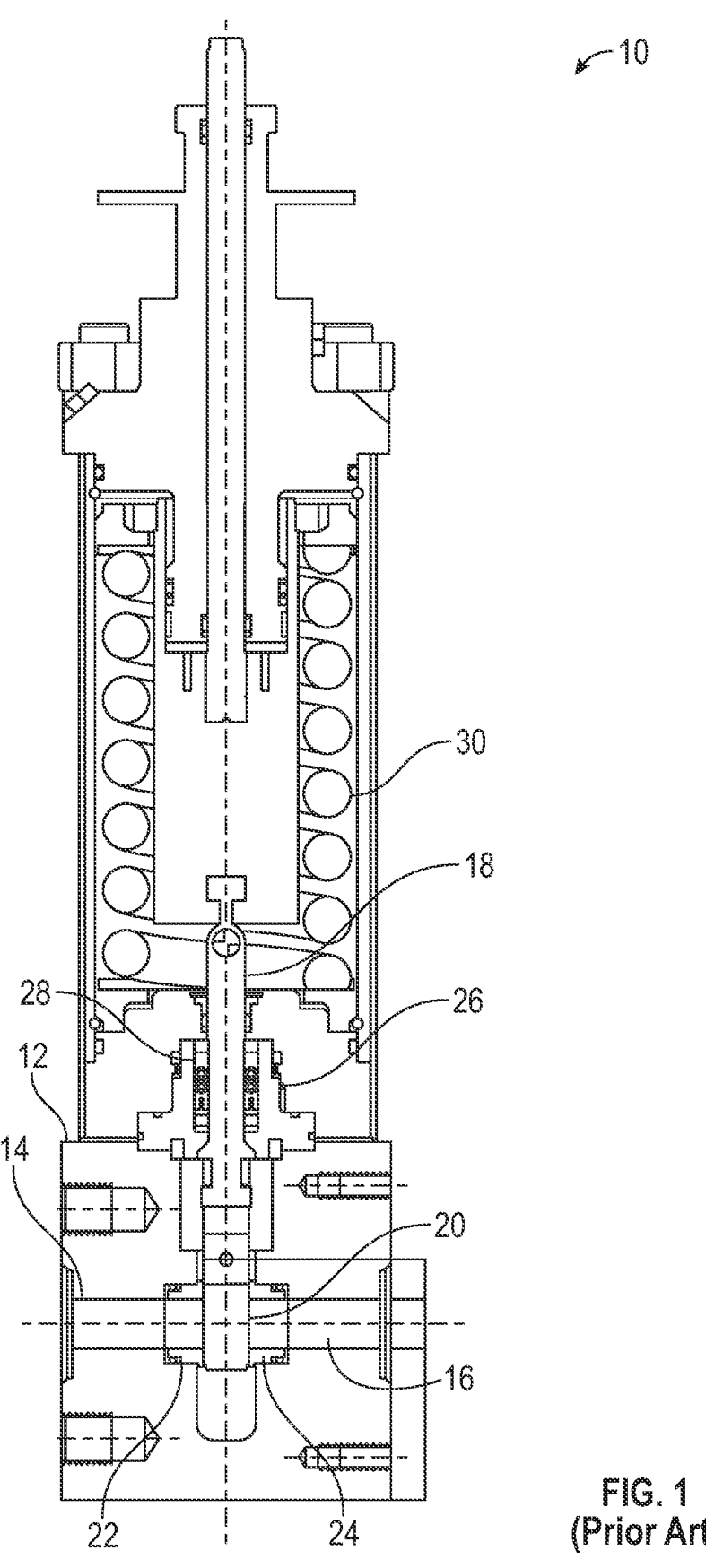
FIG. 1 illustrates a cross-sectional view of an exemplary hydraulically actuated gate valve assembly relating to the prior art.

The drawing figures do not limit the present disclosure to the specific embodiments disclosed and described herein. The drawings are not necessarily to scale; emphasis is instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized, and changes can be made without departing from the scope of the present disclosure. Therefore, the following detailed description is not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments but is not necessarily included. Thus, the technology can include a variety of combinations and/or integrations of the embodiments described herein.

Embodiments of the present disclosure relate to providing a magnetically actuated gate valve with a valve stem that is actuated via an external magnetic actuator. Thus, a fail-close gate valve may be included without a large, powerful spring because the spring is not used to counteract the pressure differential associated with a subsea environment. Instead, the pressure associated with the valve cavity is equalized with a pressure of the valve bore such that the large pressure differential is not a factor, and one or more dynamic seals associated with sealing portions of the valve stem are not included.

FIG. 1 illustrates a cross-sectional view of an exemplary hydraulically actuated gate valve assembly 10 relating to the prior art. The hydraulically actuated gate valve assembly 10 includes a valve body 12 with a bore disposed therethrough having a first bore end 14 at a first side and a second bore end 16 at a second side. The hydraulically actuated gate valve assembly 10 further includes a valve stem 18 with a gate 20 disposed at an end of the valve stem 18. The gate 20 is configured to optionally block or allow flow through the valve bore. For example, when the hydraulically actuated gate valve assembly 10 is in an open position, the gate 20 allows fluid to flow from the first bore end 14 to the second bore end 16, but when the hydraulically actuated gate valve assembly 10 is in a closed position, the gate 20 blocks the flow of fluid from the first bore end 14 to the second bore end 16.

A first valve seat 22 is disposed adjacent to the gate 20 on the first side, and a second valve seat 24 is disposed adjacent to the gate 20 on the second side. The valve seats 22, 24 are configured to abut up against the gate 20 to form a seal. The hydraulically actuated gate valve assembly 10 further includes a bonnet 26 disposed above the valve body 12. The bonnet 26 includes stem packing seals 28 configured to provide a dynamic seal to the valve stem 18 as the valve stem 18 is translated into (or out of) the valve bore.

A typical fail-close gate valve includes a fail-close spring 30 configured to bias the valve stem 18 into a closed position. The spring 30 is disposed external to a valve cavity of the valve assembly 10 and, therefore, does not come into contact with the bore fluid. Additionally, the spring 30 typically has to counteract a pressure associated with the hydraulically actuated gate valve assembly 10 being disposed at extreme depths underwater. The hydraulically actuated gate valve assembly 10 can be actuated into an open position by pushing the valve stem 18 downward and compressing the spring 30 such that an opening 21 in the gate 20 is exposed to the valve bore. In some embodiments, the opening 21 includes a borehole disposed through a portion of the gate 20.

The hydraulic actuation of the hydraulically actuated gate valve assembly 10 is further contemplated by the pressure associated with deep-sea environments because the hydraulic fluid accounts for the pressure differential between the surface and working depth. Accordingly, the spring 30 is typically exceedingly large and powerful to account for hydraulic actuation in the deep-sea environment. In some cases, the large, powerful spring may impart large compressive forces on relatively small components.

The present disclosure contemplates a means to reduce the spring force used to provide fail-close functionality at depth and further simplifies the sealing of a valve assembly. In particular, embodiments of the present disclosure are contemplated that provide a magnetically actuated gate valve assembly with a valve stem disposed entirely within a valve cavity of the valve assembly such that a pressure within the valve bore is equalized with a pressure of the valve cavity. As such, the issue of hydraulic actuation at depth is resolved, and the spring force used to bias a valve stem into a closed position is reduced.

Figure 2A:
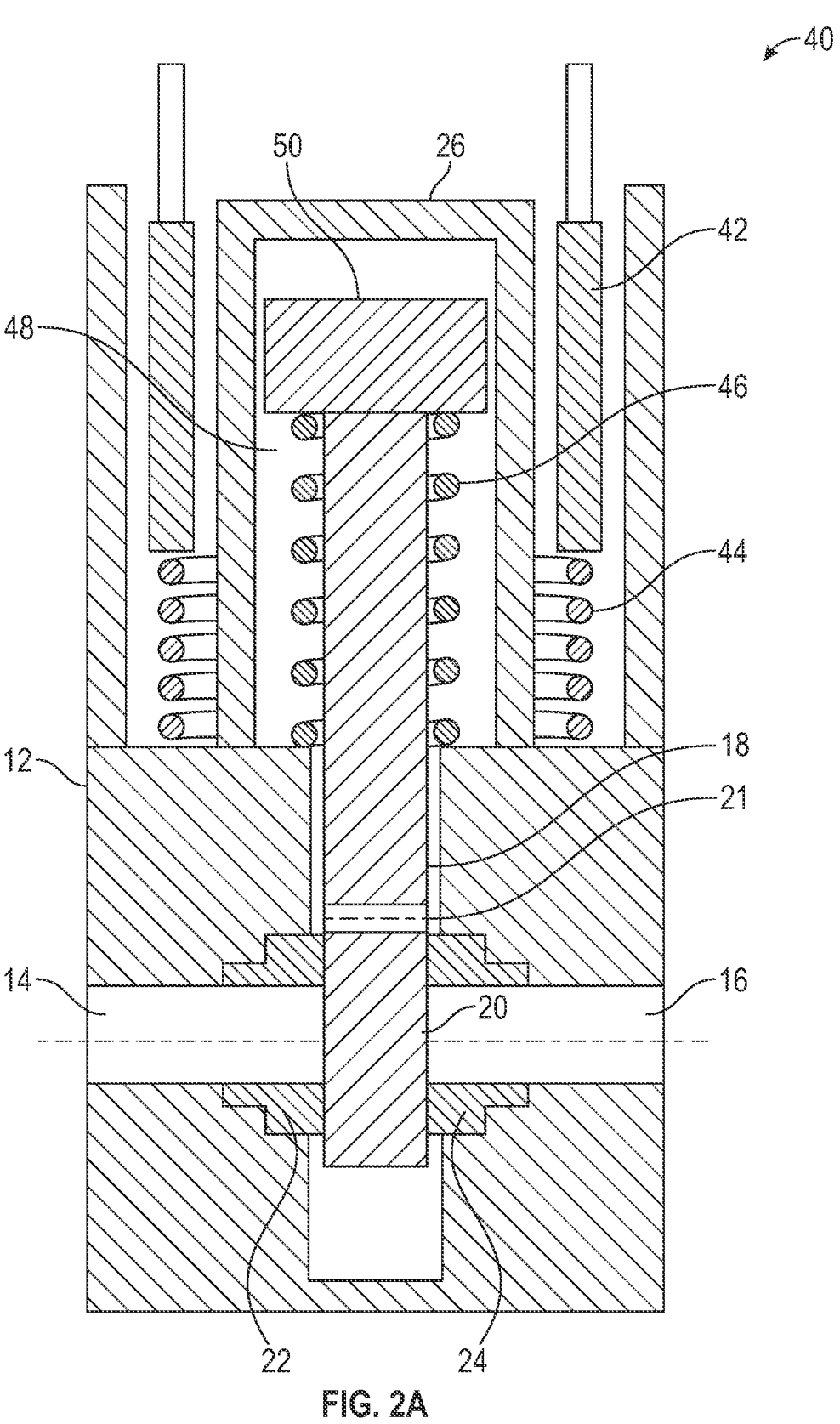
FIG. 2A illustrates a cross-sectional view of an exemplary magnetically actuated gate valve assembly in a closed position relating to some embodiments of the present disclosure.
Figure 2B:
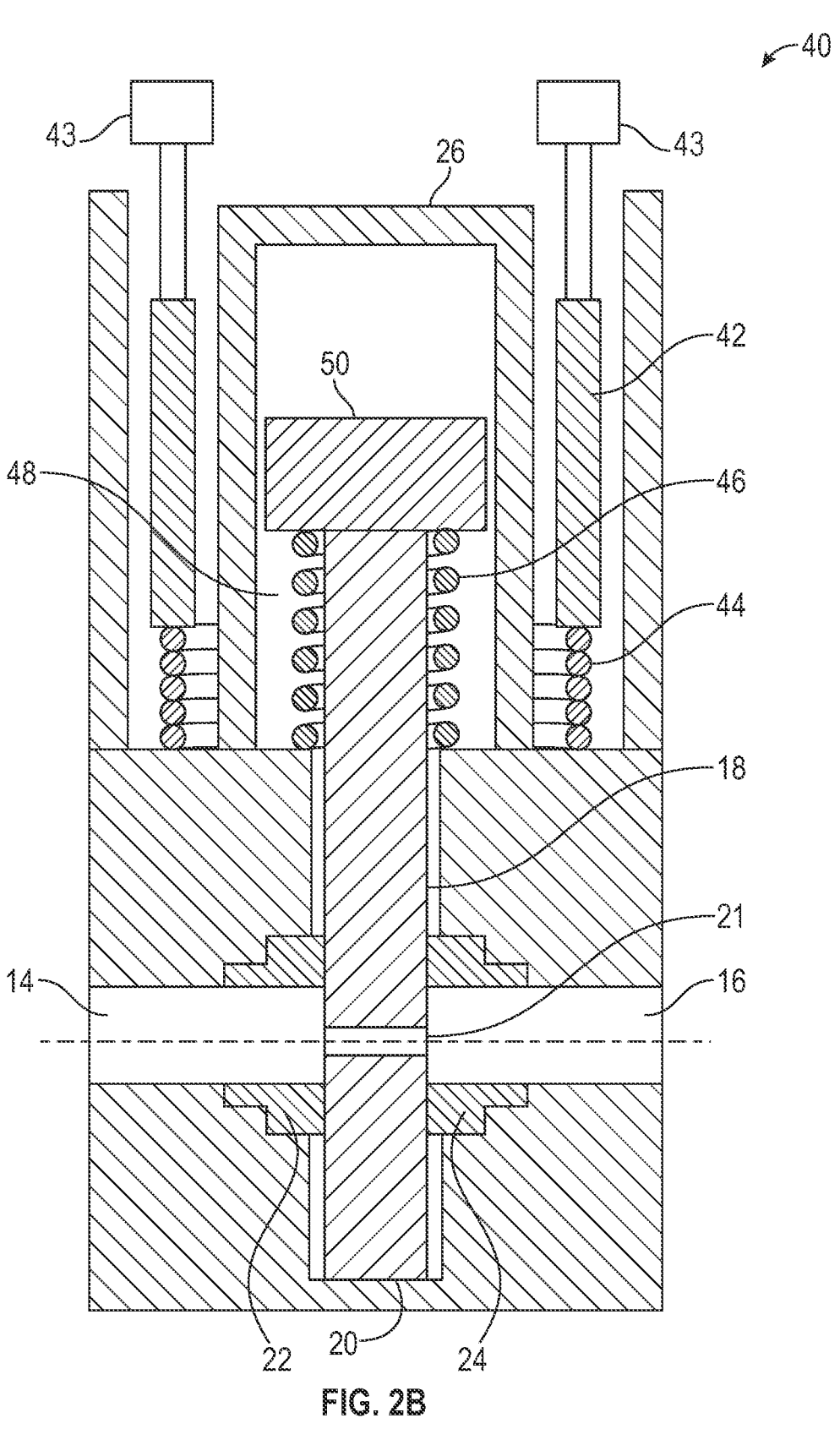
FIG. 2B illustrates a cross-sectional view of an exemplary magnetically actuated gate valve assembly in an open position relating to some embodiments of the present disclosure.

FIGS. 2A and 2B illustrate cross-sectional views of an exemplary magnetically actuated gate valve assembly 40 relating to some embodiments of the present disclosure. In particular, FIG. 2A illustrates the magnetically actuated gate valve 40 in a closed position, and FIG. 2B illustrates the magnetically actuated gate valve 40 in an open position, each of which will be described in further detail below. The magnetically actuated gate valve assembly 40 may be disposed in a subsea environment. For example, in some embodiments, the magnetically actuated gate valve 40 may be disposed on a well tree assembly, also referred to as a "Christmas" tree or X-mas tree. Alternatively, in some embodiments, the magnetically actuated gate valve 40 may be disposed on a subsea manifold or associated component. Further still, in some embodiments, the magnetically actuated gate valve 40 may be disposed on a chemical injection portion or another fluid injection portion of a subsea well system, as well as other suitable subsea and non-subsea structures such as, for example, any of an inline structure, a pump, or a high integrity pressure protection system (HIPPS), as well as other structures not explicitly described herein.

The magnetically actuated gate valve assembly 40 includes the valve body 12, the first bore end 14, the second bore end 16, the valve stem 18, the gate 20, the first valve seat 22, the second valve seat 24, and the bonnet 26, as described above. However, the magnetically actuated gate valve assembly 40 differs from the hydraulically actuated gate valve assembly 10 in a number of ways. For example, the magnetically actuated gate valve 40 includes a bonnet 26 disposed above the valve stem 18 such that the valve stem 18 is enclosed by the bonnet 26. Further, the stem packing seals 28 (of FIG. 1) may not be included in the magnetically actuated gate valve 40 or may be disposed elsewhere. In some embodiments, the stem packing seals 28 are not included because a dynamic pressure seal is not applied between the lower portion of the valve assembly 40 and the upper portion of the valve assembly. For example, the pressure may be equalized between the valve bore and a valve cavity in which the valve stem 18 is disposed such that the pressure is the same or substantially similar.

The magnetically actuated gate valve 40 further includes a magnetic actuator 42, including one or more magnets disposed externally around the valve stem 18. The magnetic actuator 42 is configured to be magnetically coupled to at least a portion of the valve stem 18. For example, each of the magnetic actuator 42 and the valve stem 18 may include one or more permanent magnets or electromagnets. Alternatively, or additionally, embodiments are contemplated in which one or more magnets are only included in one of the components, and the one or more magnets interact with ferrous metal disposed within the other component. For example, the valve stem 18 may be composed at least partially of a steel material (or other ferromagnetic material) such that a magnetic coupling is formed between a magnet on the magnetic actuator 42 and the ferrous portion of the valve stem 18. Further, in some embodiments, at least a portion of the valve stem 18 is a magnet or a magnet is attached to the valve stem 18. For example, an upper portion 50 of the valve stem 18 may include a magnetic material. Further still, in some embodiments, a magnet may be disposed internal to at least a portion of the valve stem 18. Additionally, embodiments are contemplated in which the upper portion 50 or at least another portion of the valve stem 18 includes one or more magnets or a magnetic coating.

In some embodiments, an external spring 44 is included and coupled to the magnetic actuator 42 to bias the magnetic actuator 42 into a particular position. For example, the external spring 44 may be disposed beneath the magnetic actuator 42 such that the external spring 44 is compressed as the magnetic actuator 42 is translated down, and the external spring 44 biases the magnetic actuator 42 upward.

In some embodiments, the magnetically actuated gate valve 40 includes one or more additional actuators 43 coupled to the magnetic actuator 42. For example, the additional actuators 43 may include either or both of an electric actuator, such as an electric motor, a hydraulic actuator, such as a hydraulic piston, or any other suitable form of linear or rotational actuator. Further, embodiments are contemplated in which the additional actuator 43 includes a rotary actuator coupled to an axial mounted power screw coupled to the magnetic actuator 42 such that rotation of the rotary actuator drives linear motion of the magnetic actuator 42. In some embodiments, an additional actuator 43 is included for each respective magnetic actuator 42 and coupled to each respective magnetic actuator 42. The additional actuator 43 may include an external actuator (disposed external to the valve cavity) including any of an electrical actuator, a hydraulic actuator, or a manual actuator.

In some embodiments, the external spring 44 is not included. For example, in some embodiments, the magnetic actuator 42 is not biased into any particular position. Instead, the magnetic actuator 42 may freely translate responsive to an active signal. Further, embodiments are contemplated in which the magnetic actuator 42 includes one or more permanent magnets placed on a threaded rod or worm gear, which is coupled to a motor, as described in further detail below and shown in FIG. 3. Accordingly, the motor can be driven, via any of electrical actuation, hydraulic actuation, or another suitable form of actuation, which causes the worm gear to rotate such that the one or more magnets are translated along the stroke length of the valve stem 18. Alternatively, or additionally, in some embodiments, any other suitable form of external actuation with or without a worm gear or other form of gear may be used. For example, a hydraulic piston or electric actuator may be coupled directly to the magnetic actuator 42 and configured to translate the magnetic actuator 42 across a stroke length.

In some embodiments, any combination of a variety of spring configurations is contemplated. For example, a first embodiment may include both the external spring 44 and the internal spring 46, a second embodiment may include the external spring 44 but not the internal spring 46, and a third embodiment may include the internal spring 46 but not the external spring 44. Further still, embodiments are contemplated in which no springs may be included, and another means of biasing the valve into the fail-close position is incorporated, such as, any combination of active and passive biasing means. For example, in some embodiments, the valve stem may not be passively biased into the closed position and is instead actively shifted between the open and closed positions. Further, embodiments are contemplated in which the valve assembly is oriented such that gravitational forces are used to bias the valve into the closed position. Similarly, embodiments are contemplated in which forces associated with subsea pressure may be used to bias the valve into the closed position.

The magnetic actuator 42 may include any suitable form of magnet, such as magnets formed of pure iron, iron alloys and other ferrite-based materials, neodymium, neodymium alloys, alnico formed of aluminum, nickel, and cobalt, and combinations of various other compounds and other elements, as well as other suitable magnetic materials not explicitly described herein. The magnetic actuator 42 may include a magnetic sleeve configured to be movably placed over an upper portion of the valve assembly 40. For example, the magnetic actuator 42 may be a cylindrical sleeve concentric to the valve stem 18 that slides vertically to impart a magnetic force on the valve stem 18. Alternatively, or additionally, in some embodiments, the magnetic actuator 42 may include a magnetic ring configured to be concentric with the valve stem 18.

In some embodiments, the magnetically actuated gate valve 40 further includes an internal spring 46 disposed within a valve cavity 48 of the magnetically actuated gate valve 40. For example, the valve cavity 48 may refer to an internal portion encased by the valve bonnet 26 and the valve body 12 through which the valve stem 18 is configured to extend through. Accordingly, the internal spring 46 is configured to be coupled to the valve stem 18 within the valve cavity 48. In some embodiments, an upper portion 50 of the valve stem 18 is configured to be coupled to the internal spring 46. For example, the upper portion 50 may include an increased diameter that exceeds that of the internal spring 46 such that the internal spring 46 is compressed as the valve stem 18 translates downward. The internal spring 46 is configured to impart an upward force onto the valve stem 18 that biases the valve stem 18 into the closed position, as shown in FIG. 2A. In some embodiments, the valve stem 18, along with the upper portion 50, forms a magnetically actuated piston configured to translate vertically within the valve cavity 48.

In some embodiments, the valve cavity 48 is configured to physically isolate the valve stem 18 from the magnetic actuator 42. Accordingly, no form of physical coupling is included between the valve stem 18 and the magnetic actuator 42 is included, but the components are configured to move in unison via magnetic coupling. For example, a magnetic field associated with the magnetic actuator 42 is able to penetrate into an internal portion of the valve cavity 48 to facilitate the magnetic coupling.

In some embodiments, the fluid within the valve bore may be permitted to flow into the valve cavity 48 such that the pressure is equalized with the valve cavity 48. Accordingly, embodiments are contemplated in which the internal spring 46 includes a corrosion-resistant material configured to protect the internal spring 46 from a corrosive fluid within the valve cavity 48. For example, a corrosion-resistant coating may be included on an external surface of the internal spring 46. Alternatively, or in addition, in some embodiments, the internal spring 46 may be formed entirely, or at least partially, of a corrosion-resistant material. Examples of corrosion-resistant materials include aluminum, Inconel, titanium, tantalum, galvanized steel, brass, copper, cadmium, zinc, nickel-chromium alloys, cobalt-chromium alloys, and copper-nickel alloys, as well as other suitable corrosion-resistant materials not explicitly described herein. Further, in some embodiments, non-metal materials may be included in a corrosion-resistant coating such as ceramic coatings. Additionally, in some embodiments, the corrosion-resistant material is selected based, at least in part, on the type of bore fluid. Further still, embodiments are contemplated in which other components of the valve exposed to the bore fluid are also corrosion-resistant. For example, in some embodiments, an internal surface of the valve cavity 48 may include a corrosion-resistant coating to thereby prevent the fluid therein from damaging the valve assembly 40.

The magnetically actuated gate valve 40 can be selectively adjusted between the closed position and the open position, as shown in FIGS. 2A and 2B, respectively, through magnetic actuation by the magnetic actuator 42. For example, the magnetic actuator 42 may be coupled to another actuator that causes the magnetic actuator 42 to translate downward, thereby compressing the external spring 44 (if included) and shifting the magnetically actuated gate valve 40 into the open position such that fluid flows from the first bore end 14 to the second bore end 16 or vice versa. The magnetic coupling of the magnetic actuator 42 and the valve stem 18 causes the valve stem 18 to translate along with the magnetic actuator 42 such that the internal spring 46 if included, is also compressed. When the magnetic actuator 42 is shifted into the open position, as shown in FIG. 2B, an opening 21 in the gate 20 is aligned at least partially with the valve bore such that the fluid is able to flow through the opening 21 into the opposing side of the gate. Conversely, when the magnetic actuator 42 is in the closed position, as shown in FIG. 2A, the opening 21 in the gate 20 is unaligned with the valve bore such that the fluid is blocked from flowing through the gate 20.

Figure 3:
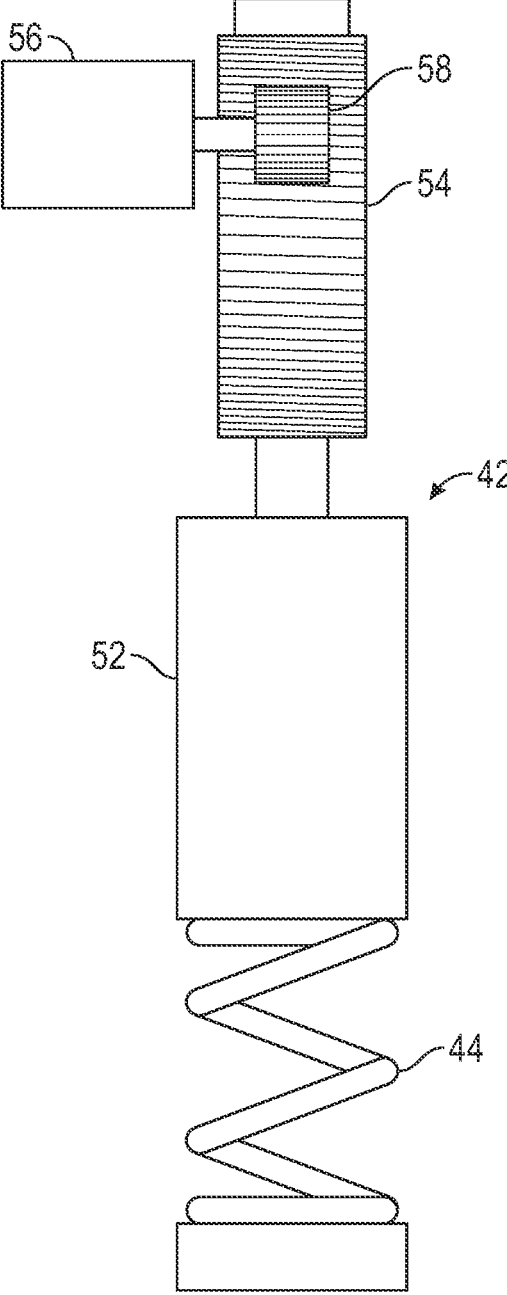
FIG. 3 illustrates an exemplary magnetic actuator relating to some embodiments of the present disclosure.

In some embodiments, the magnetic actuator 42 is driven electrically. For example, an electric motor or electric piston may be coupled to the magnetic actuator 42 to cause the magnetic actuator 42 to translate responsive to a received signal. Alternatively, or additionally, in some embodiments, the magnetic actuator 42 is driven hydraulically. For example, a hydraulic actuator such as a hydraulic piston may be coupled to the magnetic actuator 42 such that the magnetic actuator 42 is translated responsive to a change in pressure of a hydraulic fluid. Further, in some embodiments, other suitable forms of actuation are contemplated, such as any combinations of hydraulic, electric, magnetic, and mechanical actuation, as well as other suitable forms of actuation not explicitly described herein. Further still, in some embodiments, the magnetic actuator 42 may be adjusted in response to a manual input. For example, a remotely operated valve, linear actuator, or other external tool may be included to provide rotation to an axially mounted power screw or worm gear 54 (as shown in FIG. 3 and described in further detail below) coupled to the magnetic actuator 42.

Embodiments are further contemplated in which the magnetic actuator 42 includes an electromagnet. For example, the magnetic actuator 42 may include an electromagnetic coil disposed externally around the valve cavity 48. Accordingly, the electromagnetic coil may be electrically actuated to activate a magnetic field that causes the valve stem 18 to translate. In some embodiments, different portions of the electromagnetic coil may be activated selectively to move the valve stem 18 to a particular position within the valve cavity 48. For example, portions of the electromagnetic coil may be disposed along the stroke length of the valve stem 18 such that the valve stem 18 can be translated into a position responsive to the portion of the electromagnetic coil that is activated via magnetic attraction. Alternatively, in some embodiments, depending on the operating environment of the magnetically actuated gate valve 40, it may be difficult to provide a suitable amount of electricity to activate the electromagnetic coil. Accordingly, in some such embodiments, other forms of magnetic actuation are contemplated, such as the translation of a permanent magnet, as described above.

In some embodiments, any combination of a variety of suitable forms of sealing elements may be used to seal portions of the valve assembly 40. In particular, any combination of metal-to-metal seals, translating self-seals, bellows seals, or other suitable forms of seals may be used. For example, in some embodiments, one or more static seals may be included at connection points of the valve bonnet 26 and the valve body 12. The static seals may include metal-to-metal seals, which are substantially more reliable than dynamic seals included in a typical stem packing seal. Further, in some embodiments, static metal-to-metal seals may be included at other locations of the magnetically actuated gate valve 40. In some embodiments, the valve body 12 and valve bonnet 26 may be separate components joined together via any suitable means of connection, such as mechanical fasteners, welding, or any other joining technique not explicitly described herein.

It should be understood that the magnetically actuated gate valve 40 shown is just one example of how the gate valve assembly can be configured and that other suitable configurations are also contemplated. In some embodiments, any number of components of the magnetically actuated gate valve 40 may be removed, additional components may be added, and components may be rearranged. For example, in some embodiments, a compression spring may be replaced with a tensile spring in either the external spring 44 or the internal spring 46. Here, the spring may also be rearranged and coupled to a different portion of the valve assembly 40. Further, in some embodiments, the valve stem 18 may be rearranged such that the gate 20 is in the open position when the valve stem 18 is translated downward. For example, the opening 21 in the gate 20 may be shifted to another position on the valve stem 18 to facilitate the alternate configuration.

FIG. 3 illustrates an exemplary magnetic actuator 42 relating to some embodiments of the present disclosure. In some embodiments, the magnetic actuator 42 include a sleeve 52. The sleeve 52 may include a rigid hollow cylindrical structure that is configured to be placed around the bonnet 26 (of FIGS. 2A and 2B) and concentric to the valve stem 18. In some embodiments, the sleeve 52 includes one or more magnets disposed therein or thereon. Alternatively, in some embodiments, the entire sleeve 52, or at least a portion thereof, is magnetic.

As described mentioned above, the magnetic actuator 42 may be coupled to an external spring 44 (external to the valve cavity 48) configured to bias the magnetic actuator 42 into a closed position. In some embodiments, the external spring 44 is attached to a bottom surface of the sleeve 52. The external spring 44 may also be configured to be placed externally around the bonnet 26 and concentric to the valve stem 18. In some embodiments, the magnetic actuator 42 includes or is coupled to a worm gear 54. For example, the magnetic actuator 42 may include a rod with gear teeth disposed on an upper portion of the rod, thereby forming the worm gear 54. The worm gear 54 is coupled to a motor 56 such that the motor 56 drives the rotation of the worm gear 54. For example, an output shaft of the motor 56 may be coupled to a worm wheel gear 58 that drives rotation of the worm gear 54 through a coupling of gear teeth on the worm gear 54 and the worm wheel gear 58.

In some embodiments, the motor 56 includes an electric motor driven by electrical power. For example, in some embodiments, the motor 56 may be powered via an existing electrical system of the subsea system. In some such embodiments, the reduction in spring power to provide the fail-close mechanism allows for a relatively lower amount of electrical energy to be used to open the valve. Accordingly, the motor 56 may be powered by an auxiliary or existing power system, which would not be suitable for typical hydraulically actuated valves with large, powerful springs. Further, embodiments are contemplated in which the motor 56 is powered via an independent electrical system. Alternatively, in some embodiments, other forms of driving the motor 56 are contemplated. For example, in some embodiments, a hydraulic or pneumatic motor is used. Further still, embodiments are contemplated in which a motor is not used to drive the magnetic actuator 42. For example, in some embodiments, the sleeve 52 may be coupled to an end of a hydraulic piston that is configured to be driven by hydraulic pressure.

The motor 56 and gear coupling is shown with the motor shaft perpendicular to the stroke of the magnetic actuator 42. However, further embodiments are contemplated in which other motor and gear configurations are contemplated. For example, in some embodiments, the motor 56 is aligned such that the motor shaft is parallel to the stroke of the sleeve 52, similar to the gear configuration of an electric linear actuator. Further still, in some embodiments, any suitable form of converting rotational motion into linear motion may be used to translate the magnetic actuator 42. In some embodiments, any form of linear actuator may be coupled to the magnetic actuator 42 to provide axial motion to the magnetic actuator 42 to provide an axial stroke to the valve stem 18.

Additionally, embodiments are contemplated in which the worm gear 54 shown may be replaced with a power screw having a threaded portion coupled to an output of the motor 56 such that the motor 56 drives rotation of the power screw resulting in linear translation of the power screw and the magnetic actuator 42.

In some embodiments, the magnetically actuated gate valve 40, as described herein, may be incorporated into any of a variety of systems. For example, in some embodiments, the magnetically actuated gate valve 40 may be incorporated into a subsea manifold system with one or more magnetically actuated gate valves packed tightly into a compact manifold assembly. However, it should be understood that the subsea manifold system is just one exemplary application of the magnetically actuated gate valve 40 and that the magnetically actuated gate valve 40 may be incorporated into any of a number of other systems and structures including any combination of the structures and systems described herein, as well as other suitable systems not explicitly described herein. In some such embodiments, the magnetically actuated gate valve 40 takes up a substantially smaller amount of space compared to a typical hydraulically actuated gate valve of a similar bore size due to the reduction in spring size and power. For example, in some embodiments, the overall size and power of the fail-close spring is reduced by about a factor of three as compared to a standard spring for a typical hydraulically actuated fail-close gate valve. Accordingly, the magnetically actuated gate valve 40 is more suitable for compact systems in which a large amount of space for installation is not present, such as a densely packed manifold assembly.

Alternatively, or additionally, in some embodiments, one or more magnetically actuated gate valves may be incorporated into a subsea well tree system. For example, in some embodiments, a magnetically actuated gate valve 40 may be disposed along a respective bore of each branch connection to the subsea tree to thereby control flow through each branch connection. In some embodiments, additional magnetically actuated gate valves may be incorporated into a subsea system to provide redundancy or additional flow control.

In some embodiments, the magnetically actuated gate valve 40 may be implemented in a small bore system such as, for example, a subsea chemical injection system. Here, the magnetically actuated gate valve 40 may be placed along a chemical injection bore or other fluid injection bore through which a chemical fluid is pumped into a subsea well or other system. Accordingly, the magnetically actuated gate valve 40 may be used to control the flow of the chemical fluid by selectively opening, closing, and/or adjusting the magnetically actuated gate valve 40. However, it should be understood that the magnetically actuated gate valve 40 may be included for systems of any bore size.

Figure 4:
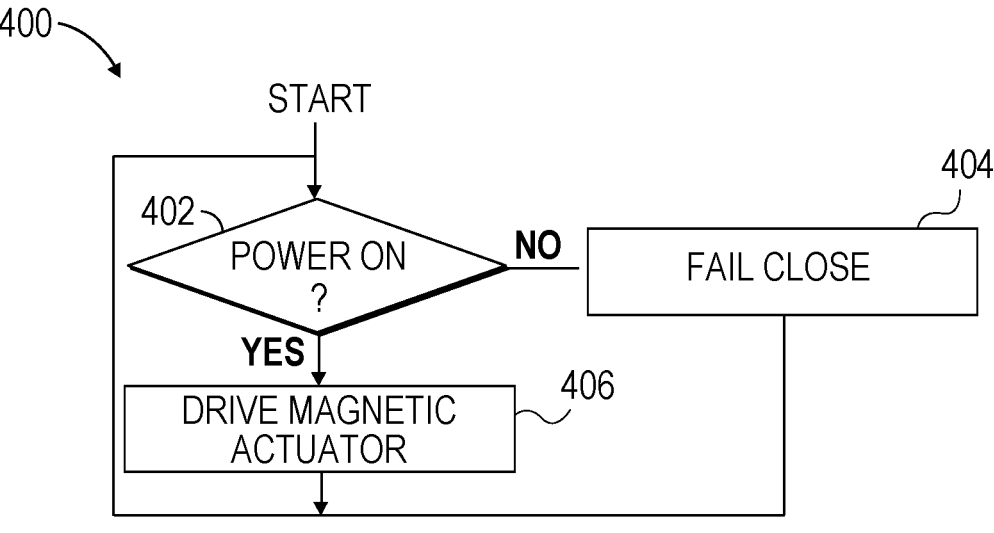
FIG. 4 illustrates an exemplary process of operating a magnetically actuated gate valve relating to some embodiments of the present disclosure.

FIG. 4 illustrates an exemplary process 400 of operating a magnetically actuated gate valve relating to some embodiments of the present disclosure. It should be understood that the process 400 described herein is just one example of how the related systems and assemblies can be operated and that a variety of different processes of operation are also contemplated.

At step 402, a delineation is made as to whether the magnetically actuated gate valve is in a powered on state or a powered off state. In some embodiments, the power state is determined based on at least one signal associated with the magnetically actuated gate valve assembly 40. For example, in some embodiments, an electronic signal including an open command may be transmitted to the magnetic actuator 42 via a control system. Alternatively, in some embodiments, the at least one signal may include a hydraulic pressure transmitted through a hydraulic line from a hydraulic controller.

Embodiments are contemplated in which the magnetically actuated gate valve assembly 40 is powered on automatically. For example, the magnetically actuated gate valve 40 may be powered on responsive to an automatically generated signal associated with an automated operation routine of a subsea system. Alternatively, in some embodiments, the magnetically actuated gate valve 40 can also be controlled manually. For example, embodiments are contemplated in which the magnetic actuator 42 is translated responsive to a manual action, such as an operator turning a handwheel coupled to the magnetic actuator 42.

At step 404, the valve 40 is shifted into the closed position responsive to the power-off state of the magnetic actuator. For example, the valve stem 18 may be biased into the closed position responsive to the spring force imparted by the internal spring 46, as described above. Alternatively, or additionally, in some embodiments, other suitable forms of fail-close operation are contemplated. For example, in some embodiments, the valve stem 18 may be biased into the closed position by gravity or another external force. Accordingly, if electrical or hydraulic power to the magnetically actuated gate valve 40 is lost, the magnetically actuated gate valve 40 may be biased into the closed state to prevent the unintentional flow of fluid through the bore.

At step 406, the magnetic actuator 42 is driven to shift the valve assembly 40 into the open position responsive to determining the power associated with the magnetic actuator 42. In some embodiments, the open position is provided by actively translating the magnetic actuator 42 vertically downward. As the magnetic actuator 42 is translated the valve stem 18 also translates responsive to the magnetic coupling. As described above, the magnetic actuator 42 may be driven by any suitable actuator such as, for example, an electric or hydraulic motor or an electric or hydraulic piston. For example, in some embodiments, an electrical signal is provided to an electric motor, which activates the motor. The motor may be coupled to the magnetic actuator, for example, via one or more gears, a worm gear, a power screw, or another suitable mechanism to covert rotation into linear motion of the magnetic actuator 42, such that rotation of the motor shaft drives linear translation of the magnetic actuator.

In some embodiments, any number of the steps described herein with respect to process 400 may be repeated. For example, in some embodiments, the process 400 is repeated periodically to check if a power is available to shift the valve into the open position. Further, in some embodiments, additional steps may be included. For example, in some embodiments, the magnetically actuated gate valve may include a plurality of open positions such that the flow may be adjusted through magnetic actuation. For example, the magnetic actuator may be shifted to position the valve gate 20 in a partially open position such that the fluid flow is reduced compared to a fully open position.

The following embodiments represent exemplary embodiments of concepts contemplated herein. Any one of the following embodiments may be combined in a multiple-dependent manner to depend from one or more other clauses. Further, any combination of dependent embodiments (e.g., clauses that explicitly depend from a previous clause) may be combined while staying within the scope of aspects contemplated herein. The following clauses are exemplary in nature and are not limiting.

Clause 1. A magnetically actuated gate valve for a subsea system, the magnetically actuated gate valve including a valve stem disposed within a valve cavity of the magnetically actuated gate valve, the valve stem including a valve gate disposed at one end of the valve stem; at least one biasing element coupled to the valve stem, the at least one biasing element configured to bias the valve stem into a fail-close position; a magnetic actuator magnetically coupled to at least a portion of the valve stem, the magnetic actuator configured to selectively adjust the valve stem between a closed position and an open position; and at least one seal disposed in the valve cavity providing a pressure seal. Thus, the illustrative embodiment provides technological improvements over conventional techniques by implementing external magnetic actuation of a valve stem.

Clause 2. The magnetically actuated gate valve of clause 1, wherein the at least one biasing element includes an internal spring disposed within the valve cavity.

Clause 3. The magnetically actuated gate valve of any of clauses 1 or 2, further including an external spring disposed external to the valve cavity and coupled to the magnetic actuator, the external spring configured to bias the magnetic actuator into a fail close position.

Clause 4. The magnetically actuated gate valve of any of clauses 1-3, wherein the magnetically actuated gate valve is integrated into a fluid injection port of the subsea system.

Clause 5. The magnetically actuated gate valve of any of clauses 1-4, wherein the at least one seal includes a static seal.

Clause 6. The magnetically actuated gate valve of any of clauses 1-5, wherein the static seal includes a metal-to-metal seal.

Clause 7. The magnetically actuated gate valve of any of clauses 1-6, wherein the magnetically actuated gate valve is configured to be placed within a fluid path associated with a production bore or annulus bore of the subsea system.

Clause 8. A valve assembly for a subsea system, the valve assembly including a valve cavity; a valve stem disposed within the valve cavity, the valve stem including a valve gate disposed at one end of the valve stem; at least one biasing element disposed within the valve cavity and coupled to the valve stem, the at least one biasing element configured to bias the valve stem into a fail-close position; and a magnetic actuator including one or more magnets magnetically coupled to a magnetic portion of the valve stem, the magnetic actuator configured to selectively adjust the valve stem between a closed position and an open position. Thus, the illustrative embodiment provides technological improvements over conventional techniques by implementing external magnetic actuation of a valve stem.

Clause 9. The valve assembly of clause 8, further including an external actuator coupled to the magnetic actuator, the external actuator configured to drive the magnetic actuator.

Clause 10. The valve assembly of any of clause 8 or 9, wherein the one or more magnets include one or more magnetic sleeves disposed concentrically around the magnetic portion of the valve stem.

Clause 11. The valve assembly of any of clauses 8-10, wherein the biasing element includes an internal spring, the valve assembly further including at least one external spring coupled to the magnetic actuator.

Clause 12. The valve assembly of any of clauses 8-11, further including: a valve bore that is coupled to a bore of the subsea system, wherein the valve bore is open when the valve stem is in the open position and the valve bore is closed when the valve stem is in the closed position, wherein a pressure within the valve cavity is equalized with a pressure of the bore of the subsea system.

Clause 13. The valve assembly of any of clauses 8-12, further including: a valve bonnet that extends above a top surface of the valve stem.

Clause 14. The valve assembly of any of clauses 8-13, wherein the one or more magnets includes one or more permanent magnets.

Clause 15. A valve assembly for a subsea system, the valve assembly including a valve cavity; a valve stem disposed within the valve cavity, the valve stem including a valve gate disposed at one end of the valve stem; at least one biasing element configured to bias the valve stem into a fail-close position; a magnetic actuator including one or more magnets magnetically coupled to a magnetic portion of the valve stem, the magnetic actuator configured to selectively adjust the valve stem between a closed position and an open position; and an external actuator coupled to the magnetic actuator, the external actuator configured to drive motion of the magnetic actuator to selectively adjust the valve stem. Thus, the illustrative embodiment provides technological improvements over conventional techniques by implementing external magnetic actuation of a valve stem.

Clause 16. The valve assembly of clause 15, wherein the at least one biasing element includes a spring disposed external to the valve cavity.

Clause 17. The valve assembly of any of clauses 15 or 16, further including: an internal spring disposed within the valve cavity, wherein at least a portion of the internal spring includes a corrosion-resistant material.

Clause 18. The valve assembly of any of clauses 15-17, further including: an electric motor coupled to the magnetic actuator, the electric motor configured to drive the magnetic actuator.

Clause 19. The valve assembly of any of clauses 15-18, further including: a hydraulic piston coupled to the magnetic actuator, the hydraulic piston configured to drive the magnetic actuator.

Clause 20. The valve assembly of any of clauses 15-19, wherein the one or more magnets includes one or more electromagnets.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments of the present disclosure, what is claimed as new and desired to be protected by Letters Patent includes the following:

What is claimed is:

1. A magnetically actuated gate valve for a subsea system, the magnetically actuated gate valve comprising:

a valve stem disposed within a valve cavity of the magnetically actuated gate valve, the valve stem comprising a valve gate disposed at one end of the valve stem, wherein the valve stem is translatable in an axial direction perpendicular to a bore of the magnetically actuated gate valve such that the valve gate blocks flow in a closed position and allows flow in an open position;

at least one spring element coupled to the valve stem, the at least one spring element configured to bias the valve stem into the closed position;

a magnetic actuator disposed outside of the valve cavity and magnetically coupled to at least a portion of the valve stem, the magnetic actuator configured to selectively adjust the valve stem;

an external actuator disposed outside of the valve cavity and mechanically coupled to the magnetic actuator, the external actuator operable to drive translation of the magnetic actuator in the axial direction; and at least one seal disposed in the valve cavity providing a pressure seal.

2. The magnetically actuated gate valve of claim 1, wherein the at least one spring element comprises an internal compression spring disposed within the valve cavity.

3. The magnetically actuated gate valve of claim 2, further comprising:

an external spring disposed external to the valve cavity and coupled to the magnetic actuator, the external spring configured to bias the magnetic actuator into a fail close position.

4. The magnetically actuated gate valve of claim 1, wherein the magnetically actuated gate valve is integrated into a fluid injection port of the subsea system.

5. The magnetically actuated gate valve of claim 1, wherein the at least one seal comprises a static seal.

6. The magnetically actuated gate valve of claim 5, wherein the static seal comprises a metal-to-metal seal.

7. The magnetically actuated gate valve of claim 1, wherein the magnetically actuated gate valve is configured to be placed within a fluid path associated with a production bore or annulus bore of the subsea system.

8. A valve assembly for a subsea system, the valve assembly comprising:

a valve cavity;

a valve stem disposed within the valve cavity, the valve stem comprising a valve gate disposed at one end of the valve stem, wherein the valve stem is translatable in an axial direction perpendicular to a bore of the subsea system such that the valve gate blocks flow in a closed position and allows flow in an open position;

at least one spring element disposed within the valve cavity and coupled to the valve stem, the at least one spring element configured to bias the valve stem into the closed position;

a magnetic actuator comprising one or more magnets magnetically coupled to a magnetic portion of the valve stem, the magnetic actuator disposed outside of the valve cavity and configured to selectively adjust the valve stem; and an external actuator disposed outside of the valve cavity and mechanically coupled to the magnetic actuator, the external actuator operable to drive translation of the magnetic actuator in the axial direction.

9. The valve assembly of claim 8, further comprising:

an opening disposed through the valve gate, wherein the opening aligns with the bore of the subsea system in the open position.

10. The valve assembly of claim 8, wherein the one or more magnets comprise one or more magnetic sleeves disposed concentrically around the magnetic portion of the valve stem.

11. The valve assembly of claim 8, wherein the at least one spring element comprises an internal compression spring, the valve assembly further comprising:

at least one external spring coupled to the magnetic actuator.

12. The valve assembly of claim 8, further comprising:

a valve bore that is coupled to the bore of the subsea system, wherein the valve bore is open when the valve stem is in the open position and the valve bore is closed when the valve stem is in the closed position, wherein a pressure within the valve cavity is equalized with a pressure of the bore of the subsea system.

13. The valve assembly of claim 8, further comprising:

a valve bonnet that extends above a top surface of the valve stem.

14. The valve assembly of claim 8, wherein the one or more magnets comprises one or more permanent magnets.

15. A valve assembly for a subsea system, the valve assembly comprising:

a valve cavity;

a valve stem disposed within the valve cavity, the valve stem comprising a valve gate disposed at one end of the valve stem, wherein the valve stem is translatable in an axial direction perpendicular to a bore of the valve assembly such that the valve gate blocks flow in a closed position and allows flow in an open position;

at least one spring element configured to bias the valve stem into a fail-close position;

a magnetic actuator comprising one or more magnets disposed outside of the valve cavity and magnetically coupled to a magnetic portion of the valve stem; and an external actuator mechanically coupled to the magnetic actuator and disposed outside of the valve cavity, the external actuator configured to drive motion of the magnetic actuator in the axial direction to thereby selectively adjust the valve stem.

16. The valve assembly of claim 15, wherein the at least one spring element comprises a compression spring disposed external to the valve cavity.

17. The valve assembly of claim 16, further comprising:
an internal spring disposed within the valve cavity,
wherein at least a portion of the internal spring comprises a corrosion-resistant material.

18. The valve assembly of claim 15, wherein the external actuator comprises:
an electric motor coupled to the magnetic actuator via a power screw, the electric motor configured to drive the magnetic actuator.

19. The valve assembly of claim 15, wherein the external actuator comprises:
a hydraulic piston coupled to the magnetic actuator, the hydraulic piston configured to drive the magnetic actuator.

20. The valve assembly of claim 15, wherein the one or more magnets comprises one or more electromagnets.

*     *     *     *     *